United States Patent [19]

Baird

[11] Patent Number: 4,493,475
[45] Date of Patent: Jan. 15, 1985

[54] SEAL FOR QUICK DISCONNECT COUPLING

[76] Inventor: David M. Baird, 4285 Smithsonia Dr., Tucker, Ga. 30084

[21] Appl. No.: 525,155

[22] Filed: Aug. 22, 1983

[51] Int. Cl.³ .............................................. F16K 51/00
[52] U.S. Cl. ................................. 251/149.1; 137/223
[58] Field of Search ..................... 251/149.1, 368, 339; 137/223, 614.03, 221

[56] References Cited

U.S. PATENT DOCUMENTS

| 1,700,632 | 1/1929 | Gay ................................ 251/149.1 |
| 1,874,915 | 8/1932 | Crowley ............................ 137/223 |
| 4,088,147 | 5/1978 | Krechel ............................ 251/149.1 |

FOREIGN PATENT DOCUMENTS 2213702  8/1974  France .............................. 251/149.1

Primary Examiner—James C. Yeung
Attorney, Agent, or Firm—James B. Middleton

[57] ABSTRACT

A seal for a quick disconnect coupling. The seal is made up of several washers, each washer being made of a plastic such as polytetrafluoroethylene (PTFE). The several layers allow the male member to be easily inserted while providing a good seal, and the PTFE breaks in quickly for easy operation.

3 Claims, 3 Drawing Figures

SEAL FOR QUICK DISCONNECT COUPLING

INFORMATION DISCLOSURE STATEMENT

Quick disconnect couplings are well known in the art, and have been utilized for a number of years. Such quick disconnect couplings have been used for compressed air, steam and other fluids, including both liquids and gases. The conventional quick disconnect coupling includes valve means for preventing loss of pressure in a line, the valve means being operated by a male member inserted into the female member of the coupling. There is a seal member that conventionally acts as the seal for the valve means to prevent loss of fluid pressure when the male member is not inserted, the same seal means acting to seal around the male member to prevent loss of pressure and require that fluid be directed through the tubing connected to the male member. The seal is conventionally made of a rubber or other elastomeric material for the obvious reasons that rubber will quickly conform to the shape of the valve member and/or to the male member to effect an adequate seal, even under relatively high pressure. One of the primary problems with the rubber seal member is that the rubber will be disintegrated or degraded by contact with numerous solvents and the like; and, rubber is seriously degraded when subjected to extreme temperatures. At high temperatures, the rubber may be permanently distorted so the rubber seal member will no longer seal the quick disconnect coupling, and when subjected to extremely low temperatures, the rubber will become brittle and will crack to cause leakage. Even when the rubber seal is operated in the presence of nondegrading fluids, and within the appropriate temperature range, it will be understood that rubber has an excellent memory so that, if the seal begins as very tight, the seal will virtually always be very tight, and the quick disconnect coupling will never be "broken in".

SUMMARY OF THE INVENTION

This invention relates generally to fluid sealing means, and is more particularly concerned with an improved seal for quick disconnect couplings.

The present invention provides, in a generally conventional quick disconnect coupling, a seal comprising a plurality of washers formed of a plastic material, the plastic material being stable at a wide range of temperatures and being sufficiently deformable to provide a seal for the valve member, and sufficiently deformable to receive the male member therethrough. The plurality of washers comprising the seal allows sufficient deformation of the total seal for adequate sealing of both the valve member and the male member. In the preferred embodiment of the invention, the washers consist of polytetrafluoroethylene (PTFE), though other plastic type materials may operate satisfactorily in a limited range of conditions.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENT

Figure 1:
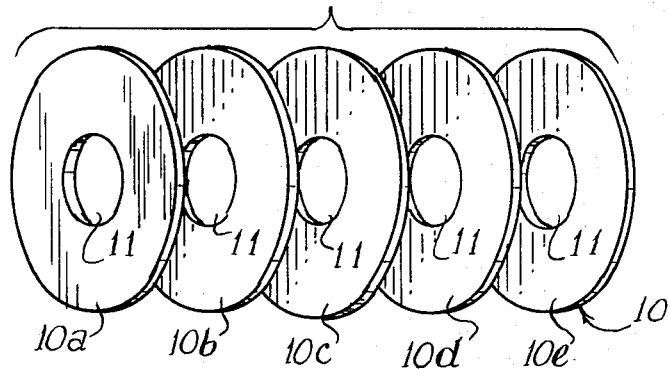
FIG. 1 is an exploded perspective view showing a seal made in accordance with the present invention.

Referring now more particularly to the drawings, and to that embodiment of the invention here presented by way of illustration, it will be seen in FIG. 1 of the drawings that the seal generally designated at 10 made in accordance with the present invention includes a plurality of washers designated individually as 10a, 10b, 10c, 10d and 10e. Each of the washers is made of, for example, polytetraflouroethylene (PTFE), which can be cut from sheets of PTFE of an appropriate thickness.

The outside diameter of the seal 10 is such as to fit snugly within the appropriate recess of the coupling, and the center hole 11 in the seal 10 is of a size to receive the valve and/or the male member of the coupling. This will be discussed in more detail hereinafter.

In the embodiment of the invention shown in FIG. 1 of the drawings, it will be seen that there are five of the washers illustrated. As will be discussed in more detail hereinafter, the number of washers is quite variable, and will be determined by the thickness of the particular sheet of PTFE from which the washers are cut, and the total thickness required for the seal 10. It should be stated here that a large number of washers is desirable, the larger number creating the better quality seal; however, there is a practical limit on the number of separate layers to be contended with in creating the seal 10, and there is a limit imposed by the thicknesses of readily available PTFE sheets from which the washers can be produced.

Figure 2:
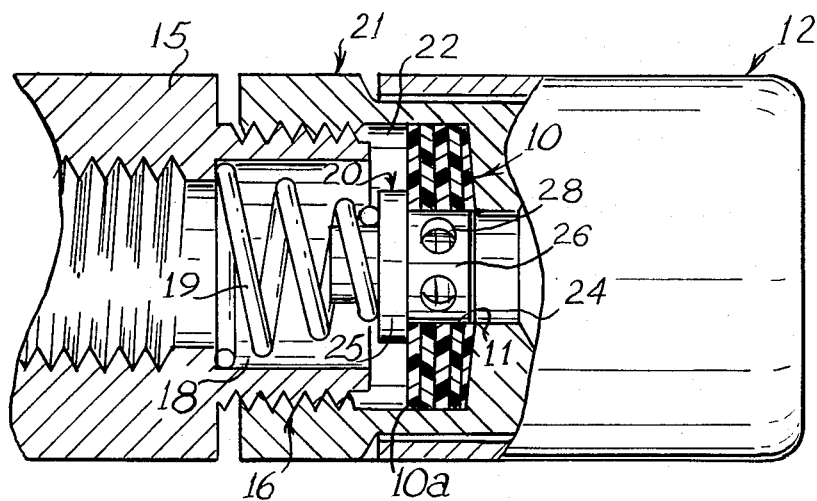
FIG. 2 is a side elevational view, partially in cross-section, showing a generally conventional quick disconnect coupling having the seal of FIG. 1 installed therein, and showing the male member removed therefrom; and, FIG. 3 is a view similar to FIG. 2 showing the male member inserted into the coupling.

Looking now at FIG. 2 of the drawings, a generally conventional quick disconnect is illustrated including the female member generally designated at 12 and the male member generally designated at 14. The female member 12 includes a fitting 15 to be attached to the source of fluid pressure, the fitting 15 including an extending nipple 16 having a central bore 18 containing a spring 19, the spring 19 carrying a valve member 20.

The nipple 16 is surrounded by a transition member 21 having a bore 22 containing the seal 10. A smaller, intersecting bore 24 is adapted to receive the male member 14 as will be discussed below.

Considering the showing of the quick disconnect coupling as shown in FIG. 2 of the drawings, it will be seen that fluid pressure will be applied from the source through the fitting 15, through the nipple 16, and to the rear portion of the valve 20. The valve member 20 includes a flange 25 having a forwardly extending cage 26, the cage 26 being annular and having a plurality of openings 28 therein. As a result of this arrangement, it will be seen that the spring 19 and the fluid pressure on the rear surface of the valve 20 will urge the flange 25 against the washer 10a of the seal 10; and, with the seal 10 extending from the valve member 20 to the walls of the bore 22, the seal 10 provides an effective seal between the fitting 15 and the bore 24.

Figure 3:
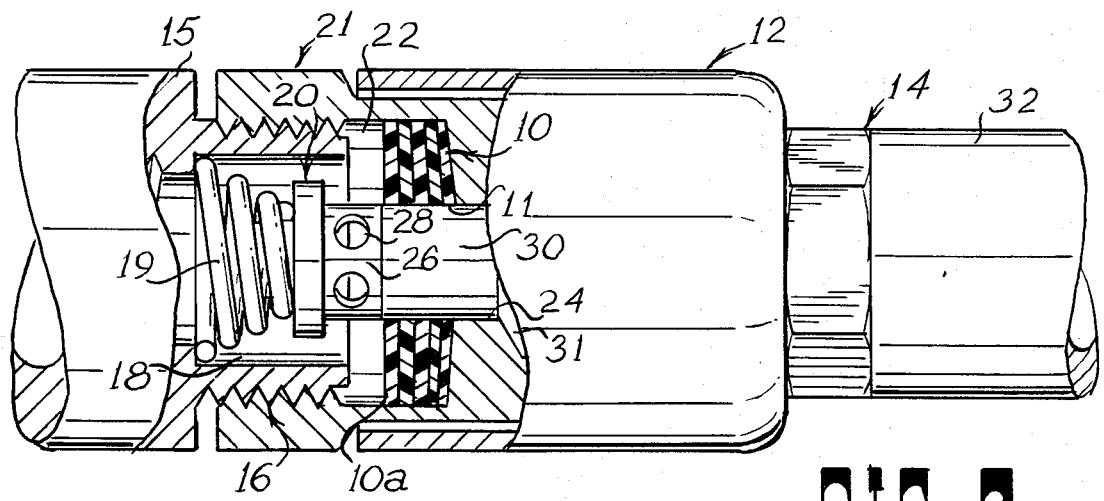

Looking now at FIG. 3 of the drawings, it will be seen that the male member 14 has been inserted into the female member 12, and the forward, valve operating portion 30 has urged the valve 20 rearwardly against the tension of the spring 19. It will be understood by those skilled in the art that the female member 12 includes locking means for engaging the locking ring 31 of the male member 14 to secure the male member 14 within the female member 12. This construction is conventional and is not here illustrated, but will be understood by those skilled in the art.

When the valve 20 is urged rearwardly as shown in FIG. 3 of the drawings, it will be seen that the flange 25 is removed from the seal 10; and, the cage 26 is of substantially the same diameter as the valve operating portion 30 of the male member 14. Because of this arrangement, the seal 10 seals the bore 22 with respect to the valve operating member 30 so there will be no fluid leakage between the hole 11 in the seal 10 and the outside surface of the valve operating member 30.

It will be remembered that there is fluid under pressure within the bore 1 of the nipple 16. When the valve member 20 is moved to the position shown in FIG. 3, it will be seen that the fluid under pressure can move around the flange 25, and enter the holes 28 of the cage 26 to enter the central open area of the cage 26 and pass into the bore in the valve operating member 30. Though not here illustrated, those skilled in the art will understand that there is a central bore within the valve operating member 30, the bore being continuous through the male member 14 to connect with the tubing 32 which is arranged to deliver the fluid where-ever desired.

It should now be understood that, when the male member 14 is removed from the female member 12, the valve member 20 will be urged forward by the spring 31, and by the fluid under pressure, so the cage 26 will again enter the hole 11 of the seal 10. The flange 25 will again be firmly urged against the washer 10a so the fluid under pressure within the bore 18 will again be sealed to prevent leakage.

From the foregoing discussion, it should now be understood that the maximum thickness of the seal 10 is dictated by the bore 22 and the position of the valve 20, in conjunction with the length of the valve operating member 30 on the male member 14. Of course, if one is designing a new quick disconnect coupling these dimensions may be varied at will to accommodate any desired form of seal 10; however, when one is attempting to replace a seal in an existing quick disconnect coupling, the above stated limitations must apply.

With the above discussion in mind, it should be recognized that a single thickness of PTFE or other such plastic material would not allow the desired deformation of the seal 10 to allow the cage 26 of the valve member 20 to enter the hole 11 and allow proper sealing therearound. With a single piece of material, the hole 11 would either be so small as not to receive the cage 26, or be so large as to preclude adequate sealing. Also, the valve operating member 30 would have to be sized either to be received easily within the hole 11 and do without an adequate seal, or have a sufficiently tight fit to provide a seal, but render the insertion of the male member 14 extremely difficult, to the point of being totally unacceptable. On the other hand, by providing a plurality of washers, each individual washer is rather easily deformed so a member can be inserted into the hole 11 even though the hole 11 is of a sufficiently small dimension to provide a quite adequate seal around the member inserted therein.

It will also be understood that PTFE generally has a useful temperature range in the vicinity of −100° F. to about 480° F., allowing the PTFE seal 10 to be used for an extremely wide range of fluids including highly volatile fluids that may cause rather severe cooling of the seal 10, and for extremely hot fluids such as superheated steam and the like. In addition to this rather wide, normally considered, useful range, PTFE generally does not become brittle until about −110° F., and is not completely destroyed until a temperature of around 750° F. is reached. PTFE is not affected by most solvents, and is otherwise extremely durable, in addition to the fact that it is well known to have natural lubricating qualities so there will be no binding of parts after the parts have remained in contact for an extended period of time.

While a rubber seal has excellent memory so that a tight seal will remain rather tight throughout its useful life, PTFE is more adaptable. As a result, the hole 11 can be made quite snug in a new seal 10; and, after a fairly small amount of use, the seal will be "broken in" so the male member 14 can be relatively easily inserted and removed.

While the foregoing discussion has referred primarily to PTFE, it will also be understood that PTFE is frequently made with fillers such as graphite, carbon fibers and the like, and such materials will also work quite satisfactorily as the material for the seal 10 as disclosed herein. Also, other plastic materials may be utilized if the demands are not extreme.

It will therefore be understood that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. In a quick disconnect coupling including a female member connected to a source of fluid under pressure, and a male member selectively receivable in said female member for receiving said fluid under pressure, said female member having a first bore in communication with said source of fluid under pressure, a second bore concentric with said first bore, a valve member in said first bore selectively movable to a first position wherein said valve member seals said first bore with respect to said second bore and to a second position, said male member including a valve operating member having a bore therethrough, said valve operating member being receivable within said second bore of said female member for urging said valve member to said second position wherein said valve member allows communication of said first bore with said bore through said valve operating member, the combination therewith of a seal comprising a plurality of washers, each washer of said plurality of washers having an outer periphery engaging the wall of said first bore and a central hole concentric with said second bore, said central hole in said washer being sized to receive said valve member when said valve member is in said first position, said central hole further being sized to receive said valve operating member of said male member and effect a fluid seal, the total thickness of said plurality of washers being sufficient to allow said valve operating member to move said valve member to said second position, each of said washers being formed of a plastic material.

2. The combination claimed in claim 1, said plastic material substantially consisting of polytetraflouroethylene.

3. The combination claimed in claim 2, said seal consisting of at least three of said washers.

* * * * *